(12) United States Patent
Nishimura

(10) Patent No.: US 7,731,409 B2
(45) Date of Patent: Jun. 8, 2010

(54) ILLUMINATION DEVICE AND METHOD FOR PRODUCING A SPATIAL PATTERN OF LIGHT AT DIFFERENT WAVELENGTHS

(75) Inventor: Ken A. Nishimura, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 676 days.

(21) Appl. No.: 11/263,234

(22) Filed: Oct. 31, 2005

(65) Prior Publication Data

US 2007/0097679 A1    May 3, 2007

(51) Int. Cl.
*F21V 7/04*    (2006.01)

(52) U.S. Cl. ............... 362/613; 362/97.1; 362/97.3; 362/227; 362/612; 362/615

(58) Field of Classification Search .......... 362/551, 362/555, 612, 97.1–97.3, 217.01, 225, 227, 362/230, 231, 613, 615, 616; 345/88, 91, 345/102; 385/901; 349/80, 104, 106, 139
See application file for complete search history.

(56) References Cited

U.S. PATENT DOCUMENTS

| | | | | |
|---|---|---|---|---|
| 6,114,715 A * | 9/2000 | Hamada | ............... | 257/72 |
| 6,198,872 B1 * | 3/2001 | Lipson et al. | ............... | 385/117 |
| 6,224,216 B1 * | 5/2001 | Parker et al. | ............... | 353/31 |
| 6,288,700 B1 * | 9/2001 | Mori | ............... | 345/102 |
| 6,768,525 B2 * | 7/2004 | Paolini et al. | ............... | 349/65 |
| 2001/0014391 A1 * | 8/2001 | Forrest et al. | ............... | 428/336 |
| 2003/0112391 A1 * | 6/2003 | Jang et al. | ............... | 349/114 |
| 2004/0041781 A1 * | 3/2004 | Sato et al. | ............... | 345/102 |
| 2004/0114396 A1 * | 6/2004 | Kobayashi et al. | ............... | 362/561 |
| 2005/0030482 A1 * | 2/2005 | Childers et al. | ............... | 353/31 |
| 2005/0095514 A1 * | 5/2005 | Lee et al. | ............... | 430/7 |
| 2005/0162358 A1 | 7/2005 | Song et al. | | |
| 2005/0219442 A1 | 10/2005 | Yang et al. | | |
| 2005/0219443 A1 | 10/2005 | Tanaka et al. | | |

* cited by examiner

*Primary Examiner*—Sandra L O'Shea
*Assistant Examiner*—Mary Zettl

(57) ABSTRACT

An illumination device for use in display devices produces a spatial pattern of light at different wavelengths using multiple light sources and waveguides. Each light source emits light at a different wavelength. The waveguides define optical apertures that are spatially arranged in a predetermined pattern, and each waveguide is optically coupled to one of the light sources to produce the spatial pattern of light at wavelengths corresponding to the predetermined pattern.

16 Claims, 3 Drawing Sheets

- 610 — PROVIDE LIGHT SOURCES AT DIFFERENT WAVELENGTHS
- 620 — PROVIDE WAVEGUIDES FOR EACH LIGHT SOURCE
- 630 — SPATIALLY ARRANGE WAVEGUIDES IN PREDETERMINED PATTERN
- 640 — OPTICALLY COUPLE LIGHT SOURCES TO WAVEGUIDES TO PRODUCE SPATIAL PATTERN OF SPECTRA

ILLUMINATION DEVICE AND METHOD FOR PRODUCING A SPATIAL PATTERN OF LIGHT AT DIFFERENT WAVELENGTHS

BACKGROUND OF THE INVENTION

Traditional display devices typically include an array of light valves disposed between a light source and an observer. For example, in liquid crystal display devices, such as those used in laptop computers, the light valves are formed from liquid crystal material disposed between a substrate and a glass cover. Individual light valves defining pixels of an image are created by forming a common electrode on the substrate and patterning a matrix of pixel electrodes on the glass cover. The liquid crystal material reacts in response to electric fields established between the common electrode and pixel electrodes to control the electro-optical response of each of the light valves.

For monochrome displays, the light source provides a uniform distribution of light, which is selectively passed by the individual light valves to produce the monochrome image. Multi-color displays are achieved by interposing a color filter array between the light source and the array of light valves, such that the light entering each light valve is preselected in wavelength. For example, a common color filter array used in display devices is a checkerboard pattern of red, green and blue filters.

However, the range of color reproducible by a display incorporating a color filter array is limited by the spectral content of light that passes through the filters. For example, most wavelength selective filters have substantial transition bands that necessarily reduce the range of spectral content of the transmitted light. As a result, there is a reduction in color fidelity in images produced using a color filter array. In addition, traditional light sources (e.g., CCFL light sources) that are typically used in color displays are known to be deficient in wavelengths corresponding to a red hue. Thus, irrespective of the quality of the filter for red light, the spectral fidelity of the image may be impaired in the red hues.

What is needed is an illumination device capable of producing a predetermined spatial pattern of light at different wavelengths without the use of a color filter. In addition, what is needed is an illumination device that enables the use of light sources with a wider color gamut than traditional light sources.

SUMMARY OF THE INVENTION

Embodiments of the present invention provide an illumination device for use in display devices. The illumination device includes light sources and waveguides. Each light source emits light at a different wavelength. The waveguides define optical apertures that are spatially arranged in a predetermined pattern, and each waveguide is optically coupled to one of the light sources to produce a spatial pattern of light at wavelengths corresponding to the predetermined pattern. For example, in one embodiment, the light sources are light emitting diodes emitting red, green and blue light.

In an exemplary embodiment, the waveguides include a respective trunk waveguide for each of the light sources and lateral waveguides, each optically coupled to one of the trunk waveguides. In one embodiment, the lateral waveguides are lightguides formed of optical fibers. In another embodiment, the lateral waveguides are optical cavities defined on an optical substrate. Each of the optical cavities has an optical aperture for emitting light formed on a surface of the optical substrate. For example, in one embodiment, the optical substrate is formed of substrate layers stacked with respect to one another, in which each of the substrate layers is optically coupled to receive light from one of the light sources and each of the substrate layers are formed of a material including optically transparent areas for transmitting light emitted from optical apertures of other substrate layers.

Embodiments of the present invention further provide a display device including an illumination device and light modulation elements defining pixels of an image. The illumination device includes light sources, each for emitting light at different respective wavelengths and waveguides spatially arranged in a predetermined pattern and each optically coupled to one of the light sources to produce a spatial pattern of light at wavelengths corresponding to the predetermined pattern. The light modulation elements are optically coupled to receive the spatial pattern of light and are individually controllable to display an image from the spatial pattern of light.

For example, in one embodiment, the light modulation elements are formed of liquid crystal material, and the light modulation elements include a common electrode configured to receive a common electrode signal for the light modulation elements and a respective pixel electrode for each of the light modulation elements. Each of the pixel electrodes is configured to receive a respective pixel signal representing a pixel of the image. Each pixel signal alters the liquid crystal material associated with the respective light modulation element to form the image.

Embodiments of the present invention further provide a method for producing a spatial pattern of light at different wavelengths. The method includes providing light sources, each for emitting light at different respective wavelengths and waveguides associated with said light sources. The method further includes spatially arranging the waveguides in a predetermined pattern and optically coupling each of the waveguides to one of the light sources to produce a spatial pattern of light at wavelengths corresponding to the predetermined pattern.

BRIEF DESCRIPTION OF THE DRAWINGS

The disclosed invention will be described with reference to the accompanying drawings, which show sample embodiments of the invention and which are incorporated in the specification hereof by reference, wherein.

DETAILED DESCRIPTION OF EXEMPLARY EMBODIMENTS

Figure 1:
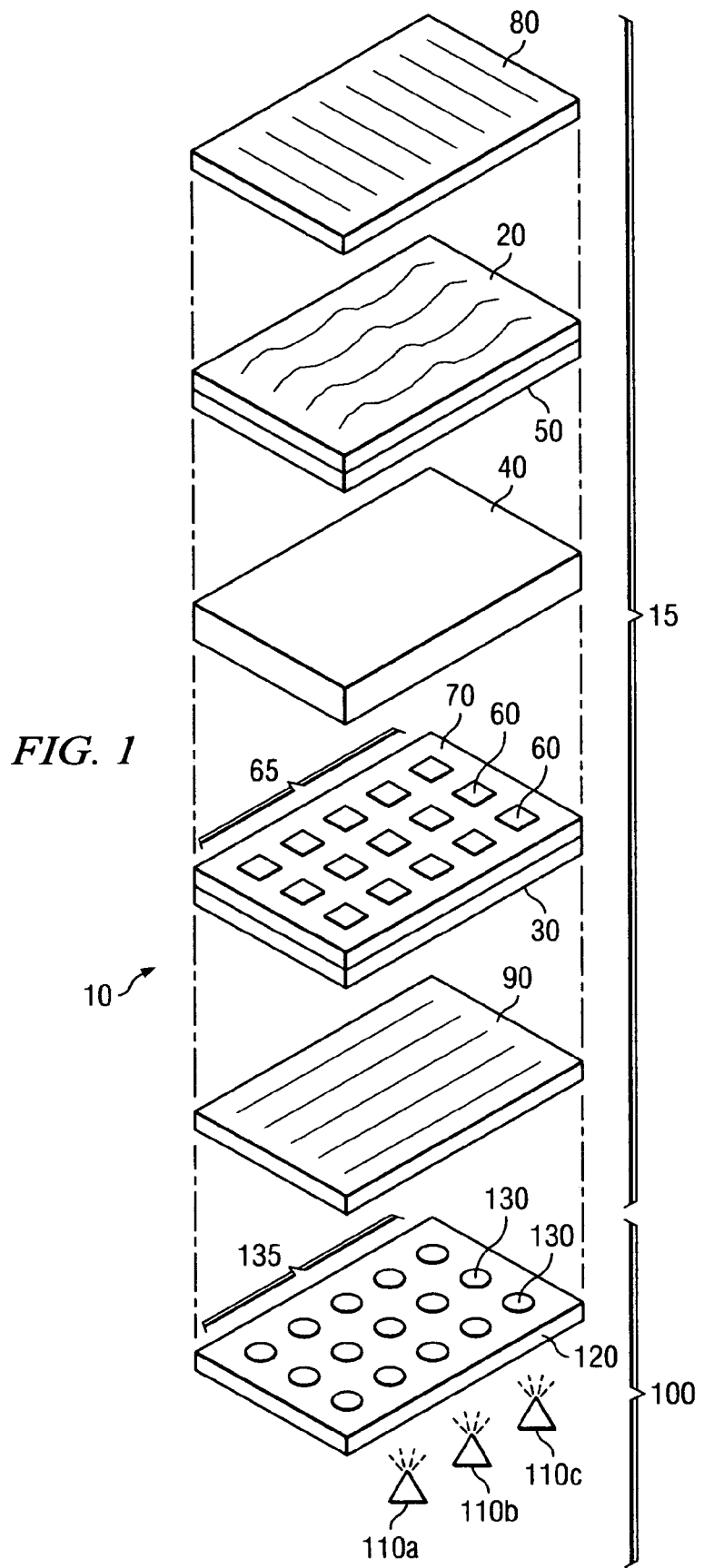
FIG. 1 is an exploded view of an exemplary liquid crystal display device illuminated using an illumination device with multiple light sources in accordance with embodiments of the present invention.

FIG. 1 is an exploded view of exemplary liquid crystal display device 10 illuminated using an illumination device 100 capable of producing a predetermined spatial pattern of light at different wavelengths without the use of a color filter, in accordance with embodiments of the present invention. The illumination device 100 includes multiple light sources 110a, 110b and 110c. Each light source 110a, 110b, 110c is operable to output light in a different wavelength range of the visible light spectrum. For example, in one embodiment, light source 110a provides blue light, light source 110b provides red light and light source 110c provides green light. However, the number of light sources 110a, 110b and 110c and the wavelength ranges produced by each light source 110a, 110b and 110c are dependent upon the particular application of the illumination device 100. In an exemplary embodiment, light sources 110a, 110b, 110c are light emitting diodes. In other embodiments, light sources 110a, 110b, 110c include any type of device capable of producing light at a particular wavelength range within the visible light spectrum.

The light sources 110a, 110b and 110c are optically coupled to a waveguide device 120. The waveguide device 120 is formed of one or more waveguides that optically couple light from one of the light sources 110a, 110b or 110c to an optical aperture 130 of the waveguide device 120. As used herein, the term "optical aperture" refers to an opening, such as a hole, gap or slit through which light may pass. The optical apertures 130 are spatially arranged in a predetermined pattern 135 to produce a spatial pattern of light at different wavelengths. For example, the optical apertures 130 can be arranged in an array of rows and columns, an array of columns ("stripes") or in a nonorthogonal pattern. The output of each optical aperture 130 of the waveguide device 120 is a respective beam of light at a wavelength corresponding to one of the light sources 110a, 110b, 110c. The beams of light output from the optical apertures 130 are directed toward a liquid crystal device 15.

The liquid crystal device 15 includes a substrate 30 on which a two-dimensional array of pixel electrodes 60 are located. The pixel electrodes 60 are spatially arranged in a pattern 65 corresponding to the pattern 135 of optical apertures 130 in the waveguide device 120, such that each pixel electrode 60 is optically coupled to receive light from only one optical aperture 130. For example, in one embodiment, each optical aperture 130 optically couples light to only a single pixel electrode 60. In another embodiment, each optical aperture 130 optically couples light to a 1×N array of spatially adjacent pixel electrodes 60. In yet another embodiment, each optical aperture 130 optically couples light to an M×N array of spatially adjacent pixel electrodes 60.

Within the substrate 30 below or adjacent to the pixel electrodes 60 is located pixel drive circuitry 70 connected to drive the pixel electrodes 60. For example, in one embodiment, the pixel drive circuitry 70 includes a matrix of thin film transistors (TFTs) for individually addressing each pixel electrode 60. Disposed above the substrate 30 is a transparent glass 20 coated with a layer of transparent electrically conductive material, such as indium tin oxide (ITO). The ITO layer serves as the common electrode 50 of the liquid crystal device 15. Encapsulated between the substrate 30 and the glass 20 is a layer 40 of liquid crystal material that reacts in response to electric fields established between the common electrode 50 and pixel electrodes 60. Adjacent an outer surface of the glass 20 is located a first polarizer 80 and adjacent an outer surface of the substrate 30 is located a second polarizer 90.

The pixel electrodes 60 in combination with pixel drive circuitry 70, common electrode 50, liquid crystal material 40 and polarizers 80 and 90 form respective individual electro-optical elements that define pixels of an image displayed or projected by the display device 10. Each electro-optical element is operable to selectively transfer the light received from a corresponding one of the optical apertures 130 to form the image. Depending on the voltages applied between the pixel electrodes 60 and common electrode 50, the liquid crystal material 40 reacts at each electro-optical element to either change or not change the polarization state of incoming light. Thus, the common electrode 50 is configured to receive a common electrode signal for the electro-optical elements and each pixel electrode 60 is configured to receive a respective pixel electrode signal for altering the liquid crystal material associated with the respective electro-optical element to form the image.

In one embodiment, the electro-optical elements allow light of a particular polarization to be transmitted or not transmitted. In another embodiment, the pixel electrodes 60 can be driven with voltages that create a partial reaction of the liquid crystal material 40 so that the electro-optical element is in a non-binary state (i.e., not fully ON or OFF) to produce a "gray scale" transmission. For example, the voltages that create a partial reaction of the liquid crystal material 40 are typically produced by applying signals on the pixel electrode 60 and common electrode 50 that not fully in or out of phase, thereby creating a duty cycle between zero and 100 percent, as understood in the art.

Figure 2:
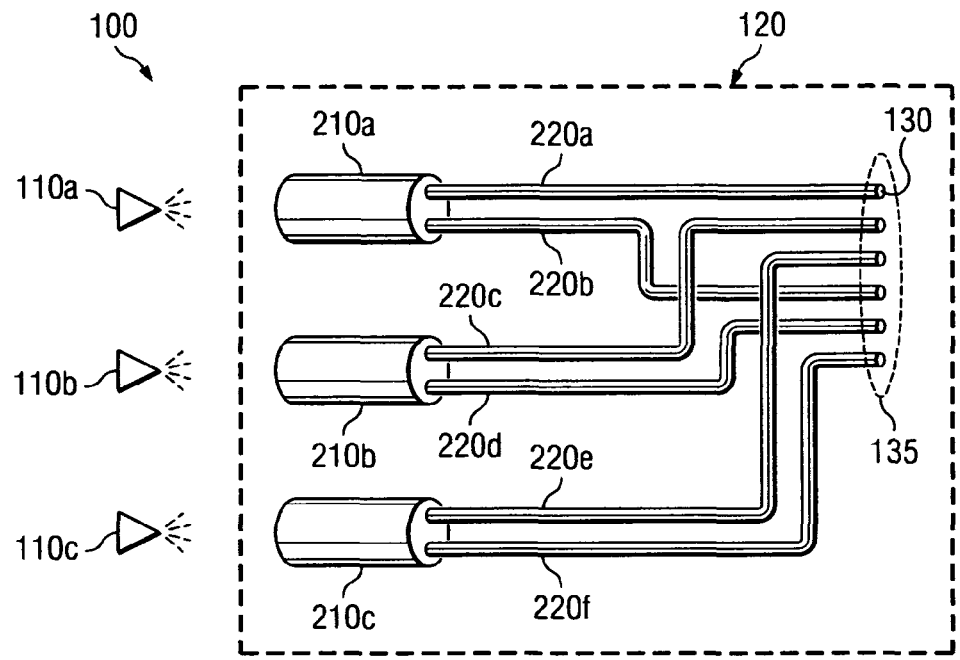
FIG. 2 is a side view of an exemplary illumination device, in accordance with embodiments of the present invention.

FIG. 2 is a side view of an exemplary illumination device 100 in accordance with one embodiment of the present invention. In FIG. 2, the illumination device 100 includes light sources 110a, 110b and 110c and waveguide device 120. The waveguide device 120 includes trunk waveguides 210a, 210b and 210c and lateral waveguides 220a-220f. In one embodiment, the lateral waveguides 220a-220f are lightguides formed of optical fibers. Each trunk waveguide 210a, 210b and 210c is optically coupled to one of the light sources 110a, 110b and 110c, respectively. In embodiments in which multiple light sources of a given wavelength are used, each of the light sources corresponding to a particular wavelength can be optically coupled to the same trunk waveguide or different trunk waveguides.

Each lateral waveguide 220a-220f is optically coupled to one of the trunk waveguides 210a, 210b or 210c. For example, lateral waveguides 220a and 220b are optically coupled to trunk waveguide 210a, lateral waveguides 220c and 220d are optically coupled to trunk waveguide 210b and lateral waveguides 220e and 220f are optically coupled to trunk waveguide 210c. Each lateral waveguide 220a-220f defines an optical aperture 130 operable to emit light in a substantially uniform manner along the length of the lateral waveguide 220a-220f. The lateral waveguides 220a-220f are spatially arranged in the waveguide device 120 in a predetermined pattern 135 to produce a desired spatial pattern of light at different wavelengths.

For example, as shown in FIG. 2, the lateral waveguides 220a-220f are spatially arranged such that lateral waveguide 220a is spatially adjacent lateral waveguide 220c, lateral waveguide 220c is spatially adjacent lateral waveguide 220e, lateral waveguide 220e is spatially adjacent lateral waveguide 220b, lateral waveguide 220b is spatially adjacent lateral waveguide 220*d* and lateral waveguide 220*d* is spatially adjacent lateral waveguide 220*f*. Therefore, assuming light source 110*a* produces red light, light source 110*b* produces green light and light source 110*c* produces blue light, the pattern 135 of lateral waveguides 220*a*-220*f* produces a spatial pattern of light alternating red, green and blue.

Figure 3:
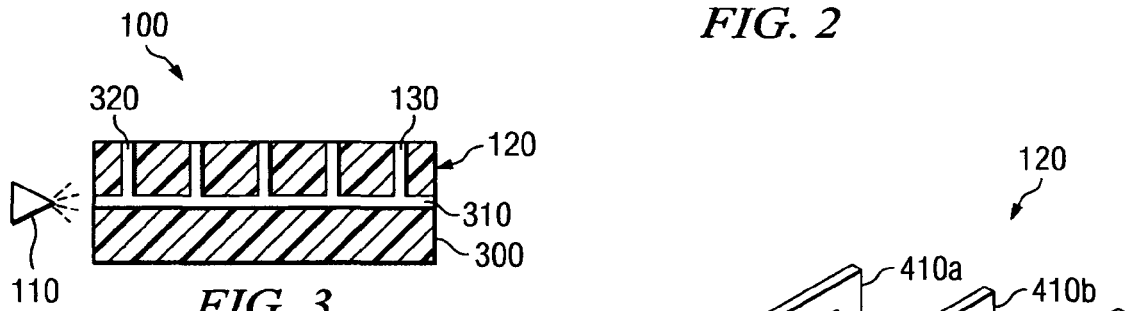
FIG. 3 is a cross-sectional view of another exemplary illumination device, in accordance with embodiments of the present invention.

FIG. 3 is a cross-sectional view of another exemplary illumination device 100 in accordance with another embodiment of the present invention. In FIG. 3, the illumination device 100 again includes light sources 110 (only one of which is shown for convenience) and waveguide device 120. However, in FIG. 3, the waveguide device 120 includes an optical substrate 300 within which waveguides are defined as optical cavities 310. For example, in one embodiment, the optical substrate 300 includes two sandwiched sheets of plastic (e.g., polyether-ether-keytone (PEEK) or other similar plastic material) having different indices of refraction on which patterns defining the optical cavities 310 are embossed.

Each optical cavity 310 is optically coupled to one of the light sources 110, and each optical cavity 310 includes one or more optical branches 320 optically coupled to one or more respective optical apertures 130 formed on a surface of the optical substrate 300. Again, the optical apertures 130 are spatially arranged on the surface of the optical substrate 300 to produce a desired spatial pattern of light at different wavelengths. As such, the optical cavity 310 and optical branches 320 are directed through the optical substrate 300 in a manner enabling optical coupling between the optical branches 320 and the optical apertures 130.

In one embodiment, as shown in FIG. 3, the optical cavity 310 and associated optical branches 320 for each light source 110 are formed within a single layer optical substrate 300 such that there is no optical coupling between the optical cavities 310 and associated branches 320 for each light source 110. In another embodiment, the optical cavity 310 and associated optical branches for each light source are formed in different layers of the optical substrate to avoid any potential optical coupling therebetween.

Figure 4:
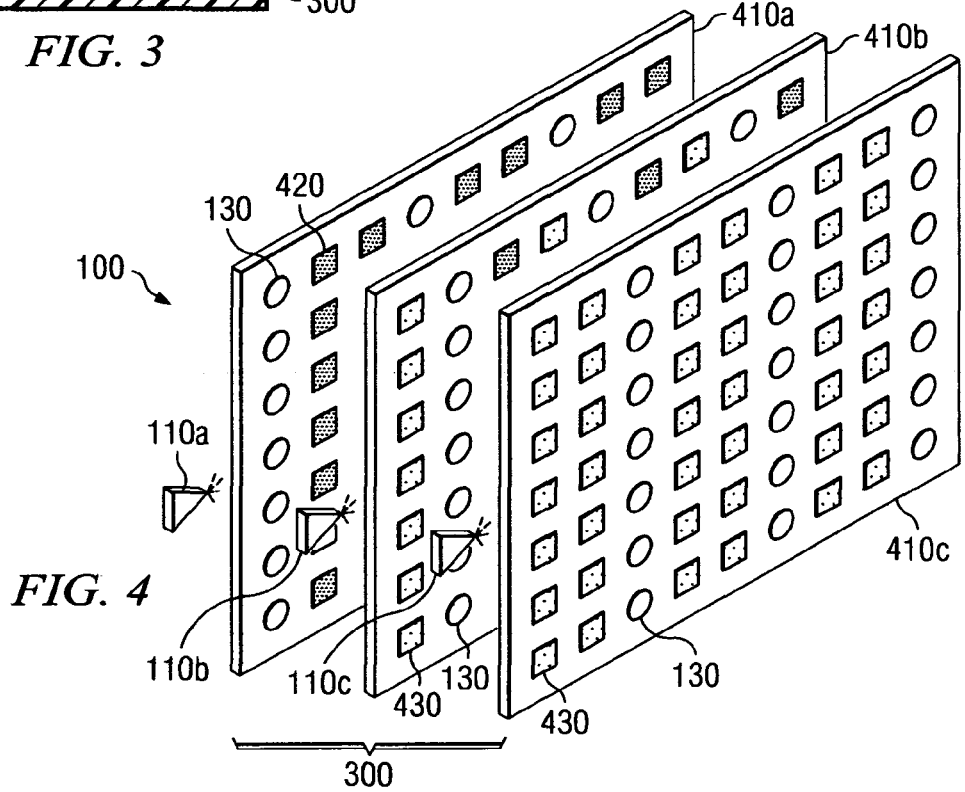
FIG. 4 is an exploded view of yet another exemplary illumination device, in accordance with embodiments of the present invention.

FIG. 4 is an exploded view of another exemplary illumination device 100 in which the optical cavity and associated branches for each light source are formed in different layers of the optical substrate 300, in accordance with yet another embodiment of the present invention. In FIG. 4, the waveguide device 120 is formed of optical substrate 300, which includes substrate layers 410*a*, 410*b* and 410*c*. The substrate layers 410*a*, 410*b* and 410*c* are stacked with respect to one another, such that substrate layer 410*b* is positioned above substrate layer 410*a* and substrate layer 410*c* is positioned above substrate layer 410*b*. Each substrate layer 410, 410*b* and 410*c* is optically coupled to receive light from one of the light sources 110*a*, 110*b* and 110*c*, respectively. Although only a single light source 110*a*, 110*b* and 110*c* for each substrate layer 410*a*, 410*b* and 410*c* is illustrated, in other embodiments, multiple light sources can be optically coupled to each of the substrate layers 410*a*, 410*b* and 410*c*.

Substrate layers 410*b* and 410*c* also include optically transparent areas 430 on the surfaces thereof for transmitting light emitted from optical apertures of other substrate layers. In one embodiment, substrate layers 410*a*-410*c* are each formed of a material that is optically transparent in the visible light spectrum to enable light emitted from a lower substrate layer (e.g., substrate layer 410*a* or 410*b*) to pass through upper substrate layers (e.g., substrate layers 410*b* and 410*c*). For example, substrate layer 410*b* includes transparent areas 430 at locations corresponding to optical apertures 130 on substrate layer 410*a* and substrate layer 410*c* includes transparent areas 430 at locations corresponding to optical apertures 130 on substrate layers 410*a* and 410*b*. Thus, substrate layers 410*a*, 410*b* and 410*c* are aligned to position transparent areas 430 of upper substrate layers 410*b* and 410*c* above optical apertures 130 on lower substrate layers 410*a* and 410*b*.

As shown in FIG. 4, substrate layers 410*a* and 410*b* may also include opaque areas 420 on the surfaces thereof for blocking light. For example, in one embodiment, the opaque areas 420 are defined by patterning a black matrix on the surface of the substrate layer to function as a light-shielding pattern. However, in other embodiments, substrate layers 410*a*, 410*b* and 410*c* may not include opaque areas 420.

Figure 5:
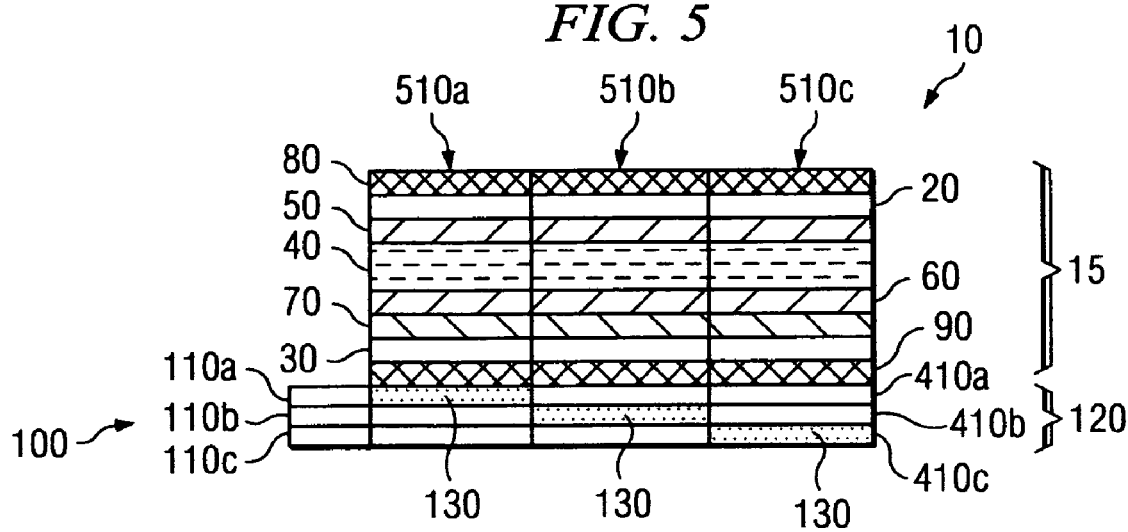
FIG. 5 is a cross-sectional view of a display device incorporating the exemplary illumination device of FIG. 4, in accordance with embodiments of the present invention.

FIG. 5 is a cross-sectional view of a display device 10 incorporating the exemplary illumination device 100 of FIG. 4, in accordance with embodiments of the present invention. In FIG. 5, the waveguide device 120 includes the stacked substrate layers 410*a*, 410*b* and 410*c* shown in FIG. 4. Each substrate layer 410, 410*b* and 410*c* is again optically coupled to receive light from one of the light sources 110*a*, 110*b* and 110*c*, respectively, and each substrate layer 410*a*, 410*b* and 410*c* includes one or more optical apertures 130 capable of producing a respective beam of light at a wavelength corresponding to a respective one of the light sources 110*a*, 110*b*, 110*c*. Each beam of light output from one of the optical apertures 130 is directed toward one or more electro-optical elements 510 in the liquid crystal device 15. For example, the beam of light output from the optical aperture 130 in substrate layer 410*a* is directed towards electro-optical element 510*a*, the beam of light output from the optical aperture 130 in substrate layer 410*b* is directed towards electro-optical element 510*b* and the beam of light output from the optical aperture 130 in substrate layer 410*c* is directed towards electro-optical element 510*c*.

Each electro-optical element 510 includes a substrate 30 on which a respective pixel electrode 60 is located. Each pixel electrode 60 is optically coupled to receive light from one of the optical apertures 130 in the waveguide device 120. For example, assuming light sources 110*a*, 110*b* and 110*c* produce red light, green light and blue light, respectively, the pixel electrode 60 in electro-optical element 510*a* receives red light, the pixel electrode 60 in electro-optical element 510*b* receives green light and the pixel electrode 60 in electro-optical element 510*c* receives blue light. Within the substrate 30 below each pixel electrodes 60 is located pixel drive circuitry 70 connected to drive the respective pixel electrode 60.

Each electro-optical element 510 further includes a transparent glass disposed above the substrate 30 on which the common electrode 50 is located. Encapsulated between the pixel electrode 60 on the substrate 30 and the common electrode 50 on the glass 20 is the liquid crystal material 40 that reacts in response to electric fields established between the common electrode 50 and pixel electrode 60. Adjacent an outer surface of the glass 20 is located a first polarizer 80 and adjacent an outer surface of the substrate 30 is located a second polarizer 90. Each electro-optical element 510 is operable to selectively transfer polarized light received from a corresponding one of the optical apertures 130 to form the image. For example, depending on the voltage applied between the pixel electrode 60 and common electrode 50 in electro-optical element 510*a*, the liquid crystal material 40 at electro-optical element 510*a* reacts to either change or not change the polarization state of the polarized light received from polarizer 90, which allows the light to be transmitted or not transmitted (or some form of "gray scale" transmission) through polarizer 80.

Figure 6:
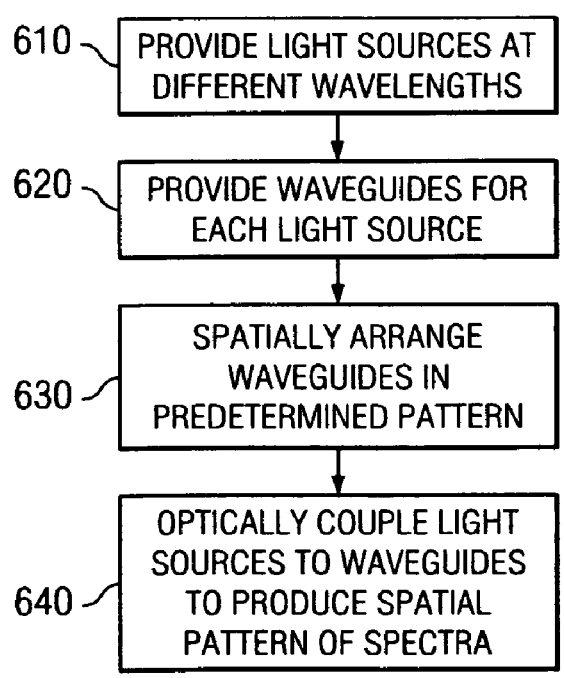
FIG. 6 is a flow chart illustrating an exemplary process for producing a spatial pattern of light at different wavelengths, in accordance with embodiments of the present invention.

FIG. 6 is a flow chart illustrating an exemplary process for producing a spatial pattern of light at different wavelengths, in accordance with embodiments of the present invention. Light at different wavelengths is produced without color filters by providing light sources, each for emitting light at different respective wavelengths (block 610), and by providing waveguides associated with the light sources (block 620). To achieve a particular spatial pattern of light, the waveguides are spatially arranged in a predetermined pattern (block 630), and each of the waveguides is optically coupled to one of the light sources to produce the spatial pattern of light at wavelengths corresponding to the predetermined pattern (block 640).

The innovative concepts described in the present application can be modified and varied over a wide rage of applications. Accordingly, the scope of patented subject matter should not be limited to any of the specific exemplary teachings discussed, but is instead defined by the following claims.

I claim:

1. An illumination device, comprising:
    light sources, each for emitting light at different respective wavelengths;
    a first substrate layer;
    a second substrate layer; and
    an intermediate substrate layer located between said first and second substrate layers, the intermediate substrate layer comprising:
        a plurality of apertures formed on a surface thereof;
        a trunk waveguide configured to receive light from at least one of said light sources;
        a plurality of optically transparent areas optically aligned with a plurality of apertures in said first substrate layer, said plurality of optically transparent areas configured to allow propagation of light of any wavelength emitted out of said plurality of apertures in said first substrate layer; and
        a plurality of optically opaque areas optically aligned with a plurality of apertures in the second substrate layer, said plurality of optically opaque areas configured to block passage of any wavelength emitted out of said plurality of apertures in said second substrate layer.

2. The illumination device of claim 1, wherein said light sources are light emitting diodes.

3. The illumination device of claim 1, wherein said light sources include at least one of: a) two or more light sources emitting red light, b) two or more light sources emitting green light or c) two or more light sources emitting blue light.

4. The illumination device of claim 1, wherein said illumination device is configured to illuminate a color liquid crystal display.

5. The illumination device of claim 1, wherein said trunk waveguide is arranged longitudinally inside said intermediate substrate layer, with a plurality of lateral waveguides oriented in an intersectional direction to said trunk waveguide, said plurality of lateral waveguides arranged for emitting light out of said plurality of apertures formed on said surface of said intermediate substrate layer.

6. The illumination device of claim 1, wherein said plurality of optically opaque areas comprises a black matrix pattern located on said surface of said intermediate substrate layer.

7. The illumination device of claim 1, wherein said first substrate layer comprises:
    a plurality of optically opaque areas located in optical alignment with said plurality of optically opaque areas of said intermediate substrate layer for further blocking the propagation of light emitted from said plurality of apertures in said second substrate layer.

8. The illumination device of claim 7, wherein said second substrate layer comprises:
    a plurality of optically transparent areas located in optical alignment with each of said plurality of apertures in said intermediate substrate layer and with each of said plurality of apertures in said first substrate layer.

9. The illumination device of claim 1, wherein the light emitted out of said plurality of apertures in said first substrate layer is light of a first wavelength; and wherein the light emitted out of said plurality of apertures in said second substrate layer is light of a second wavelength that is different than the first wavelength.

10. The illumination device of claim 9 wherein light of the second wavelength is backwards traveling light emitted rearwards from said plurality of apertures in said second substrate layer, in a direction opposite to light of the first wavelength emitted forwards from said plurality of apertures in said first substrate layer.

11. A display device, comprising:
    an illumination device including light sources, each for emitting light at different wavelengths;
    a waveguide arrangement contained inside an optical substrate that is formed of a plurality of substrate layers, the waveguide arrangement configured for emitting a spatial pattern of light out of a plurality of apertures arranged in a predetermined spatial pattern upon a surface of the optical substrate, wherein the optical substrate includes:
        a first substrate layer;
        a second substrate layer;
        an intermediate substrate layer located between said first and second substrate layers, the intermediate substrate layer comprising:
            a trunk waveguide configured to receive light from at least one of said light sources;
            optically transparent areas of the intermediate substrate layer located in optical alignment with a first set of apertures in said first substrate layer, the optically transparent areas configured for allowing passage of light of any wavelength emitted out of the first set of apertures in the first substrate layer; and
            optically opaque areas of the intermediate substrate layer located in optical alignment with a second set of apertures in said second substrate layer, the optically opaque areas configured for blocking passage of light of any wavelength emitted out of the second set of apertures in the second substrate layer; and
    electro-optical elements defining pixels of an image, said electro-optical elements being optically coupled to receive said spatial pattern of light and individually controllable to display an image from said spatial pattern of light.

12. The display device of claim 11, wherein said light sources are light emitting diodes.

13. The display device of claim 11, wherein said light sources include two or more of a first light source emitting red light, a second light source emitting green light and a third light source emitting blue light.

14. The display device of claim 11, wherein said electro-optical elements comprise liquid crystal material.

15. The display device of claim 14, wherein said electro-optical elements further comprise:
    a common electrode configured to receive a common electrode signal for said electro-optical elements; and
    a respective pixel electrode for each of said electro-optical elements, each of said respective pixel electrodes configured to receive a respective pixel electrode signal representing a pixel of said image, each said pixel electrode signal altering said liquid crystal material associated with said respective electro-optical element to form said image.

16. An illumination device, comprising:

a first substrate layer, comprising:
  a first aperture formed on a major surface of the first substrate layer;
  a first trunk waveguide embedded in the first substrate layer, the first trunk waveguide configured for receiving from a first light source, light of a first wavelength; and
  a first branch waveguide oriented in an intersectional direction to said first trunk waveguide, said first branch waveguide having a proximal end optically coupled to said first trunk waveguide for receiving a first portion of light of the first wavelength, the first branch waveguide further configured for directing the first portion of light towards the first aperture formed on the major surface of the first substrate layer;

a second substrate layer located next to the first substrate layer, the second substrate layer comprising:
  a second aperture formed on a major surface of the second substrate layer;
  a second trunk waveguide embedded in the second substrate layer, the second trunk waveguide configured for receiving from a second light source, light of a second wavelength; and
  a second branch waveguide oriented in an intersectional direction to said second trunk waveguide, said second branch waveguide having a proximal end optically coupled to said second trunk waveguide for receiving a first portion of light of the second wavelength, the second branch waveguide further configured for directing the first portion of light towards the second aperture formed on the major surface of the second substrate layer;

an optically opaque area located in the first substrate layer in alignment with the second aperture formed on the major surface of the second substrate layer, the optically opaque area configured for blocking propagation of light of the second wavelength through the first substrate layer; and an optically transparent area located in the second substrate layer in alignment with the first aperture formed on the major surface of the first substrate layer, the optically transparent area configured for allowing propagation of light of the first wavelength through the second substrate layer.

* * * * *